Jan. 17, 1967 J. M. GRANTHAM ETAL 3,298,667
REEL JACK
Filed Feb. 24, 1965
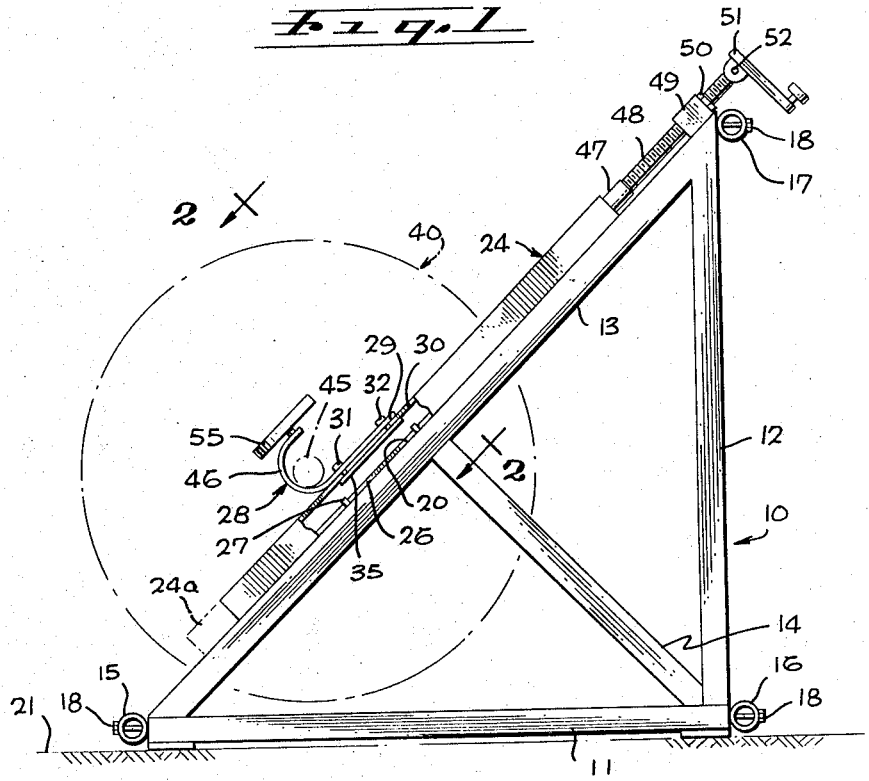
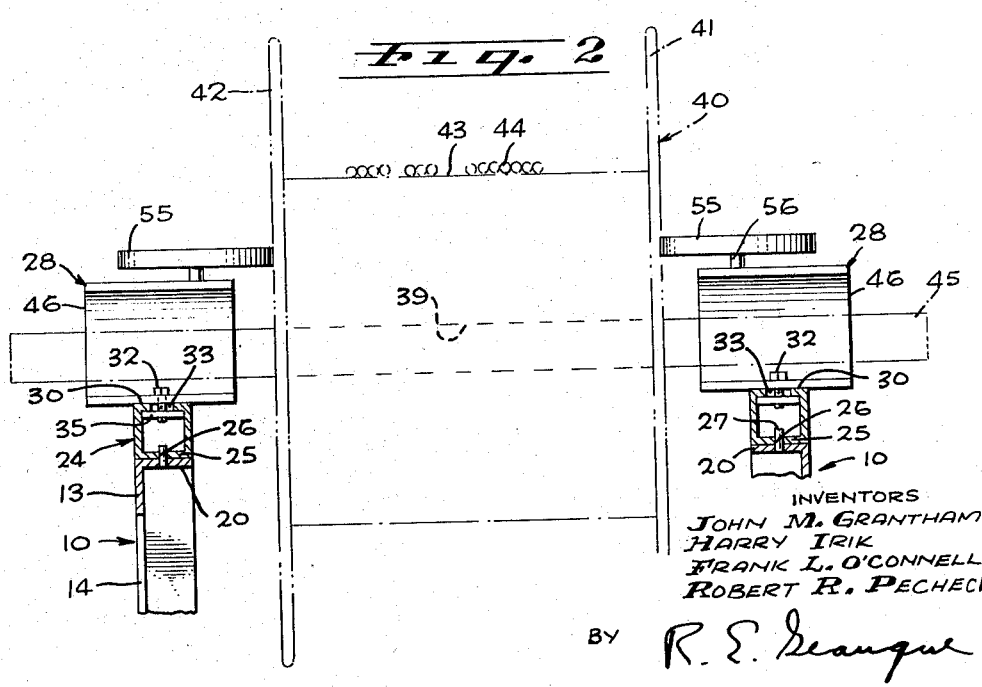
INVENTORS
JOHN M. GRANTHAM
HARRY IRIK
FRANK L. O'CONNELL
ROBERT R. PECHECK
BY R. E. Geangue
ATTORNEY 3,298,667
REEL JACK
John M. Grantham, Canoga Park, Harry Irik, Santa Monica, and Frank L. O'Connell and Robert R. Pecheck, Los Angeles, Calif., assignors to Grantham & Oleson Electrical Contractors, Inc., Venice, Calif., a corporation of California
Filed Feb. 24, 1965, Ser. No. 434,799
3 Claims. (Cl. 254—100)

This invention relates to a reel jack and more particularly to a reel jack for lifting and supporting a reel of cable from which the cable is to be unwound.

At present, heavy electrical cable is wound on large reels which have a center opening therethrough to receive a rod for lifting the reel and supporting the reel for rotation. Various types of devices have been proposed for engaging the rod after insertion through the reel and lifting the reel above the ground to permit the cable to unwind. Some of these devices are difficult to operate since they require excessive manual strength while others are not sufficiently adjustable to accommodate the various sizes of reels which result in different heights of the rod above the ground when the reel is resting on the ground.

The present invention provides a reel jack for engaging the rod passing through a reel of cable while it is sitting on the ground regardless of the height of the rod above the ground. The shaft engaging members are mounted on movable channel members which are moved along slanting frame members by means of a jack screw. By making the shaft engaging members initially adjustable along the channel members, the amount of jack screw required to move the channel members sufficiently to raise the cable reel above the ground is held to a minimum. The reel jack has identical frame members on opposite sides to provide identical slanting surfaces for the sliding channel members and the frame members are rigidly connected to prevent tipping or structural failure. The cable reel is positioned between the shaft engaging members by means of rollers on the members which guide the reel between the members.

It is therefore an object of the present invention to provide a reel jack for a cable reel which consists of identical frame members providing sliding surfaces for the reel moving members which include adjustable shaft engaging members which can compensate for different reel sizes.

Another object of the present invention is to provide a reel jack having a pair of movable members mounted on separate, spaced apart frame members and adjustable members for engaging the ends of a shaft through the cable reel while the reel is on the ground without moving said movable members.

A further object of the present invention is to provide a reel jack for raising a reel of electrical cable off the ground to permit the cable to be unwound, said reel jack having spaced frame members for supporting the cable reel therebetween.

These and other objects of the invention not specifically set forth above will become readily apparent from the accompanying description and drawings in which:

FIGURE 1 is a side elevational view of one of the frame members showing the jack screw for moving the shaft engaging members up and down; and FIGURE 2 is a section along line 2—2 of FIGURE 1 showing the channel members slidable on the slanting surfaces of the frame members and the adjustable attachment for the shaft engaging members.

Referring to the embodiment of the invention chosen for purposes of illustration, the reel jack comprises a pair of identical frame members 10 each of which is formed of angle iron and has a horizontal bottom side 11, a vertical side 12, and a slanting side 13. The sides are welded together at their ends and a strut 14 extends between the intersection of sides 11 and 12 and the center of side 13 to form a rigid frame. As illustrated in FIGURE 2, the frame members 10 are held apart by rods 15, 16 and 17 which extend between the corners of the frame members and the rods can be detachably secured to the frame members by screws 18. Since the sides 11 and 12 of each frame member are approximately equal in length, the upper surface 20 of side 13 makes approximately a 45 degree angle with the support surface 21. The upper surface 20 of each of the sides 13 slidably support a channel member 24 having a lower surface 25 which contains a slot 26 extending along most of its length. A plurality of pins 27 are secured to the surface 20 and extend perpendicularly through the slot 26 in order to permit the channel members 24 to slide on the surface 20 without leaving the surfaces.

A shaft support member 28 is located above each channel member and has a straight portion 29 lying along the upper surface 30 of each channel member 24. The straight portion 29 contains a pair of bolts 31 and 32 which project through the portion 29 and through a slot 33 in the upper surface 30 of the channel member. The bolts 31 and 32 are threaded into a plate 35 which is located below the upper surface 30 and is wider than the slot 33. When the bolts 31 and 32 are loosened, the shaft supporting member 28 can be slid along the upper surface 30 of each channel member 24. When the bolts 31 and 32 are tightened down, the member 28 will move with the channel member 24.

The standard cable reel 40 has two circular ends 41 and 42 and a cylindrical surface 43 on which the cable 44 is wound. The reel normally rests on the ends 41 and 42 so it can be rolled from one location to another. Also, the reel has a central circular opening 39 through which can be inserted a support shaft 45 and this shaft can serve to support the drum 40 above the ground when it is desired to unwind the cable 44 from the drum. After the shaft 45 is placed through the drum, it can be supported above the surface of the ground by the curved end portion 46 of the shaft support members 28 to permit the unrolling of the cable.

The upper end of each of the channel members 24 has threaded, circular end 47 welded thereto which is threaded to receive one end of a jack screw 48 and the other end passes through an enlarged opening in a lug 49 affixed to the upper corner of side 13. An enlarged collar 50 is fixed to the jack screw and bears against the lug 49 to position the screw while permitting rotation of the screw. A crank 51 is pivotally connected to the upper end of the jack screw at pivot 52. By rotation of the jack screws by the handles 51, each of the channel members 24 can be moved up and down on the surface 30 of side 13. A roller 55 is mounted on a shaft 56 projecting from each curved portion 46 of each shaft support member 28 and the distance between the rollers 55 is slightly more than the length of the reel so that when the reel is supported by the shaft 45, it is held away from the support members 28 by the rollers and the rollers also prevent the reel from moving longitudinally along the rod as the cable 44 is unwound.

In operation, the reel jack is placed on the surface 21 at a location at which it is desired to unwind the cable from the reel 40. The jack screws 48 are rotated until each of the channel members 24 is in its lowermost position indicated by the dotted line position 24a of FIGURE 1. Also, the bolts 31 and 32 are lowered so that the support members 28 can be moved downwardly along the slot 33. The reel 40 is then rolled on the surface 21 into position between the frame members 10 and the shaft 45 is inserted through the reel so that it extends across the frame members 10. Thereafter, the support members 28 are slid upwardly along the slot 33 until they engage the ends of the shaft 45. The bolts 31 and 32 are then tightened down so that the support members 28 move as a unit with the channel members 24. The handles 51 for the jack screws 48 are then rotated together to pull the channel members 24 upwardly along the surfaces 30 of sides 13 to thereby lift the reel 40 off the ground into the position illustrated in FIGURE 1. The cable 44 can then be pulled off the cable reel since the reel can rotate about the shaft 45 while it is freely supported by the support members 28.

Because of the adjustability of the support members 28, a short thread length can be utilized on the jack screws 48 for lifting a wide variation of reel sizes since the jack screws are not placed in operation until the support members 28 are in engagement with the ends of the shaft 45. The rollers 55 are supported in a position so that if they are engaged by the ends of the reel, they will rotate and produce a minimum drag force on the reel as the cable is unwound. It is understood that the cross pieces 15, 16 and 17 can be detached from the frame members 10 to permit the reel jack to be disassembled for shipping or for movement from one location to another.

While the particular reel jack structure herein shown and described in detail is fully capable of obtaining the objects and providing the advantages hereinbefore stated, it is to be understood that it is merely illustrative of the present preferred embodiment of the invention and that no limitations are intended to the details of the construction or design herein shown other than as defined in the appended claims.

What is claimed is:
1. A reel jack for lifting and supporting a cable reel while the cable is unwound from the reel comprising:
   a pair of frame members spaced apart by a distance greater than the length of said reel;
   each of said frame sections having an upwardly inclined frame surface;
   a movable member slidably supported on each of said inclined surfaces;
   means located at the top of each frame member and connected with one of said movable members for moving said movable member along said inclined surface;
   a shaft supporting member attached to each of said movable members for engaging opposite ends of a shaft inserted through said reel and for raising said reel upon operation of said moving means to permit unwinding of said cable, each of said shaft supporting members being adjustable along one of said movable members to place said shaft supporting members in engagement with the ends of said shaft prior to moving of said moving means to raise said reel;
   each of said moving means comprising a hollow channel member having a portion supported by said inclined surface and containing an elongated slot; and
   a plurality of guide pins projecting upwardly from said inclined surface into said slot for guiding the movement of said channel member along said inclined surface.
2. A reel jack as defined in claim 1 wherein:
   the upper portion of each of said channel members contains a second elongated slot;
   each of said shaft supporting members having a straight section lying along the upper portion of a channel member;
   a retainer plate located within said channel member below said upper portion; and
   bolt means for clamping said straight section and said retainer plate against said upper portion of said channel member in order to secure said shaft support member in a selected position along said channel member so that while said jack screw is fully extended each of said shaft support members can be placed in contact with the ends of said shaft to provide a full stroke for said moving means regardless of size of said reel.
3. A reel jack as defined in claim 2 wherein:
   each of said shaft supporting members has a curved section for supporting an end of said shaft; and
   a roller carried by each curved section for positioning said reel between said frame members.

References Cited by the Examiner

UNITED STATES PATENTS

| | | | |
|---|---|---|---|
| 1,629,644 | 5/1927 | Speirs | 259—99 X |
| 2,622,816 | 12/1952 | Koch | 242—58.6 |
| 3,159,381 | 12/1964 | Graafsma et al. | 254—100 |
| 3,240,471 | 3/1966 | Townsend | 254—100 |

WILLIAM FELDMAN, *Primary Examiner.*

OTHELL M. SIMPSON, *Examiner.*